United States Patent
Lang et al.

(10) Patent No.: US 8,655,470 B2
(45) Date of Patent: Feb. 18, 2014

(54) SYSTEM AND METHOD FOR STORING, USING AND EVALUATING MANUFACTURING DATA

(75) Inventors: Nicholas G. Lang, Cincinnati, OH (US); Sumit Singhal, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 415 days.

(21) Appl. No.: 12/986,783

(22) Filed: Jan. 7, 2011

(65) Prior Publication Data

US 2012/0180019 A1    Jul. 12, 2012

(51) Int. Cl.
| | |
|---|---|
| G06F 19/00 | (2011.01) |
| G01N 37/00 | (2006.01) |
| G06F 11/30 | (2006.01) |
| G21C 17/00 | (2006.01) |
| G06F 17/40 | (2006.01) |
| G06Q 10/00 | (2012.01) |
| G06K 9/00 | (2006.01) |

(52) U.S. Cl.
USPC ........... 700/109; 700/103; 700/105; 700/174; 700/180; 702/84; 702/182; 702/187; 702/188; 705/7.41; 382/152

(58) Field of Classification Search
USPC ............... 700/95, 97, 98, 103–106, 108–110, 700/117–121, 159, 174, 180, 182; 702/81, 702/84, 127, 182, 187, 188; 703/1, 2; 705/7.38, 7.41; 382/100, 141, 152
See application file for complete search history.

(56) References Cited

U.S. PATENT DOCUMENTS

| | | | |
|---|---|---|---|
| 6,253,159 B1 * | 6/2001 | Bett et al. .......................... | 702/85 |
| 6,574,561 B2 * | 6/2003 | Alexander et al. ................ | 702/5 |
| 6,631,304 B2 * | 10/2003 | Manicke et al. .............. | 700/103 |
| 6,725,230 B2 * | 4/2004 | Ruth et al. ............................ | 1/1 |
| 6,862,488 B2 * | 3/2005 | Mansour-Awad .............. | 700/97 |
| 6,968,280 B2 * | 11/2005 | Tai et al. .......................... | 702/84 |
| 7,058,560 B1 * | 6/2006 | Arakawa et al. ................ | 703/22 |
| 7,194,328 B1 * | 3/2007 | Haskins et al. ............... | 700/174 |
| 7,684,886 B2 * | 3/2010 | Sullivan et al. ................. | 700/97 |
| 7,936,614 B2 * | 5/2011 | Kim et al. ................ | 365/189.07 |
| 7,942,700 B2 * | 5/2011 | Gutierrez et al. ........ | 439/620.05 |
| 8,000,832 B1 * | 8/2011 | Schmidtke et al. ........... | 700/182 |
| 8,175,732 B2 * | 5/2012 | Dam et al. ...................... | 700/95 |
| 8,260,035 B2 * | 9/2012 | Tek et al. ....................... | 382/152 |
| 2002/0116239 A1 * | 8/2002 | Reinsma et al. ................... | 705/7 |
| 2004/0225390 A1 * | 11/2004 | Keller et al. .................... | 700/95 |
| 2005/0004781 A1 * | 1/2005 | Price et al. .................... | 702/188 |
| 2005/0170726 A1 * | 8/2005 | Brunson et al. ............... | 442/327 |
| 2007/0016319 A1 * | 1/2007 | Forster et al. ................. | 700/100 |
| 2008/0100455 A1 * | 5/2008 | Erickson et al. ........... | 340/572.8 |
| 2009/0326697 A1 * | 12/2009 | Xu et al. ........................ | 700/103 |
| 2010/0145492 A1 * | 6/2010 | Russell ......................... | 700/103 |
| 2011/0016704 A1 * | 1/2011 | Yang ............................... | 29/605 |
| 2011/0276166 A1 * | 11/2011 | Atanasoff ..................... | 700/104 |

\* cited by examiner

*Primary Examiner* — Crystal J Barnes-Bullock

(57) ABSTRACT

A computer implemented method for evaluating quality control data of a product manufactured by a partially automated manufacturing process. In the method, a database is generated which includes design specifications for the product. Manufacturing data generated from inspection of the product at each stage of the partially automated process is then received. The manufacturing data is then compared with the design specifications to determine whether the manufacturing data meets the design specifications. In one embodiment, the product is an induction coil used in electric motors.

20 Claims, 4 Drawing Sheets

US 8,655,470 B2

SYSTEM AND METHOD FOR STORING, USING AND EVALUATING MANUFACTURING DATA

FIELD OF THE INVENTION

This invention relates to manufacturing processes, and more particularly, to a method for evaluating quality control data during stages of a partially automated manufacturing process.

BACKGROUND OF THE INVENTION

The automation of a manufacturing process typically requires the use of several technologies such as control system, information, robotic technologies and others. However, certain manufacturing processes are too costly to fully automate or cannot be automated due to technological limitations. These include manufacturing processes for low volume production runs of a special order product, for example, where the costs of automating an engineered to order process are not economically justifiable. As a result, non-automated or partially automated manufacturing processes are used in order to reduce costs.

Partially automated manufacturing processes include several tasks such as order entry, inspection or quality control tasks for determining whether a product has a defect and others. In particular, aspects of a quality control task may be performed by a human inspector. Further, it is desirable to keep track of production efficiency and hand worker effectiveness and to provide feedback in order to improve a partially automated process. Therefore, there is a need for a system which improves aspects of a partially automated manufacturing process.

SUMMARY OF THE INVENTION

A computer implemented method is disclosed for evaluating manufacturing data of a product manufactured by a partially automated manufacturing process. In the method, a database is generated which includes design specifications for the product. Manufacturing data generated from inspection of the product at each stage of the partially automated process is then received. The manufacturing data is then compared with the design specifications to determine whether the manufacturing data meets the design specifications.

BRIEF DESCRIPTION OF THE DRAWINGS

The figures provide the details of the system of this invention in the construction and the functions. It is a better way to understand the invention in the visualization. Then the following descriptions will explain the invention according to these figures.

DESCRIPTION OF THE INVENTION

Figure 1:
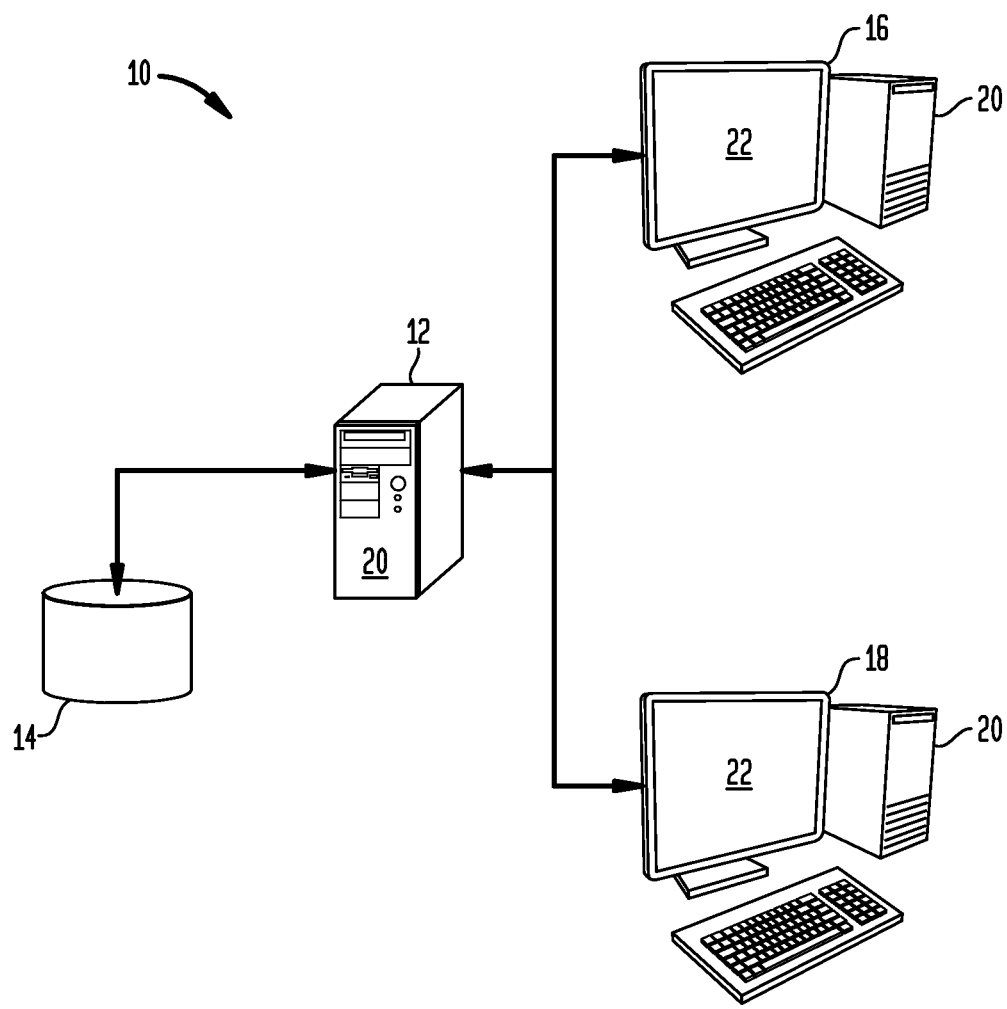
FIG. 1 depicts an exemplary computer system used to implement a manufacturing data evaluation application.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. The terms "computer", "computer system", or "server" as used herein should be broadly construed to include any device capable of receiving, transmitting and/or using information including, without limitation, a processor, microprocessor or similar device, a personal computer, such as a laptop, palm PC, desktop, workstation, or word processor, a network server, a mainframe, an electronic wired or wireless device having memory and a storage device, such as for example, a telephone, an interactive television, such as for example, a television adapted to be connected the Internet or an electronic device adapted for use with a television, a cellular telephone, a personal digital assistant, an electronic pager, a digital watch and the like. Further, a computer, computer system, or system of this embodiment may operate in communication with other systems over a communication network, such as, for example, the Internet, an intranet, or an extranet, or may operate as a stand-alone system, virtual private network, and any other internetworked system. In the description below, like reference numerals and labels are used to describe the same, similar or corresponding parts in the several views of FIGS. 1-5.

An exemplary computer system 10 used to implement a manufacturing data evaluation application 20 is shown in FIG. 1. The system 10 includes a computer server 12 connected between a data storage system 14 and user computer workstations 16, 18 by suitable connections such as a wired or wireless network connection or equivalent. The server 12 may include the manufacturing data evaluation application 20. Alternatively, the manufacturing data evaluation application 20 may reside on workstations 16, 18. The manufacturing data evaluation application 20 may be written in any programming language capable of performing the aspects of present invention. In one embodiment, Microsoft Visual Basic programming language may be used.

In one embodiment, the present invention may be used in conjunction with a partially automated manufacturing process for the manufacture of induction coils used in electric motors although it is noted that the present invention may be used with other partially automated manufacturing processes. Information or data to be used by the manufacturing data evaluation application 20 is stored in data storage system 14. With respect to induction coils, this includes design information such as motor size, voltage levels, pole counts, number of turns, physical dimensions, material requirements such as type and quantity and other design information along with parameters for an insulating machine, spreading machine or other machine used in the manufacturing process. The data storage system 14 also includes measurements previously taken by inspectors during a quality control stage, for example, of the induction coil manufacturing process. Data storage system 14 may physically form part of server 12, such as through the use of one or more internal storage drives. Alternatively, data storage system 14 may be separately configured. The data in data storage system 14 may be managed by database management software such as Microsoft SQL Server software. Data storage system 14 can manage, cooperate with, be utilized by, and/or utilize the server 12. Users of the manufacturing data evaluation application 20 may access server 12 remotely over a computer network from a user interface 22 displayed on workstations 16, 18 in a conventional manner.

Figure 2:
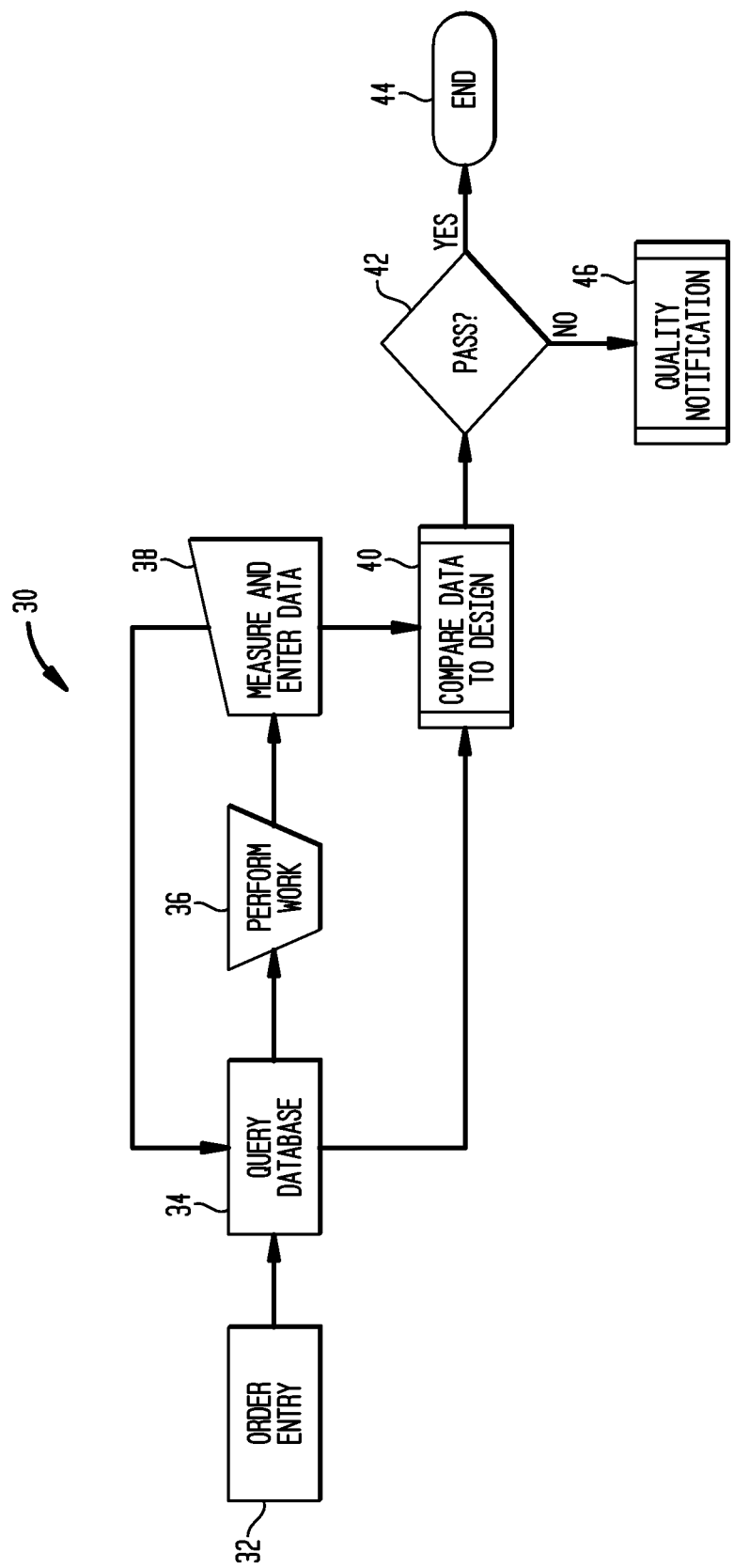
FIG. 2 is a flowchart or a method for evaluating manufacturing data of a production part.

Referring to FIG. 2, a flowchart for a manufacturing data evaluation method 30 for a partially automated manufacturing process is shown. Frequently, design specifications for an induction coil are generated on a custom or engineered to order basis. Once generated, the design specifications and associated information are then stored in data storage system 14. In step 32 of the method 30, an order for a new induction coil to be manufactured is entered. In step 34, the data storage system 14 is then queried in order to obtain the previously generated design information associated with the order.

In step 36, work is performed to complete a selected stage in the manufacturing process for the induction coil. In step 38, the induction coil undergoes a quality check where design parameters such as length, width and others are measured by an inspector. The measured data is then entered into the manufacturing data evaluation application 20 via user interface 22 displayed on workstation 16, 18 and stored in data storage system 14. At step 40, the measured data is compared to the design specifications stored in data storage system 34 for the induction coil to ensure that the specifications are met. If the design specifications are met at step 42, the method 30 ends at step 44. If the design specifications are not met at step 42, quality control is notified at step 46 so that the induction coil can be reworked or removed from production. The manufacturing process may be a multi-stage process. Therefore, step 36 through step 44 or step 36 through step 46 may be performed for each stage in the process thus providing an independent quality check at each stage. The performance of quality control inspections at each stage provides a feedback loop regarding product quality thus enabling adaptive design procedures. Further, selected steps in the process may be performed out of order as needed.

The entering of inspection data during the inspection process creates a time stamp. This enables the generation of statistics regarding production efficiency to determine hand worker effectiveness and other parameters in a partially automated manufacturing process.

Figure 3:
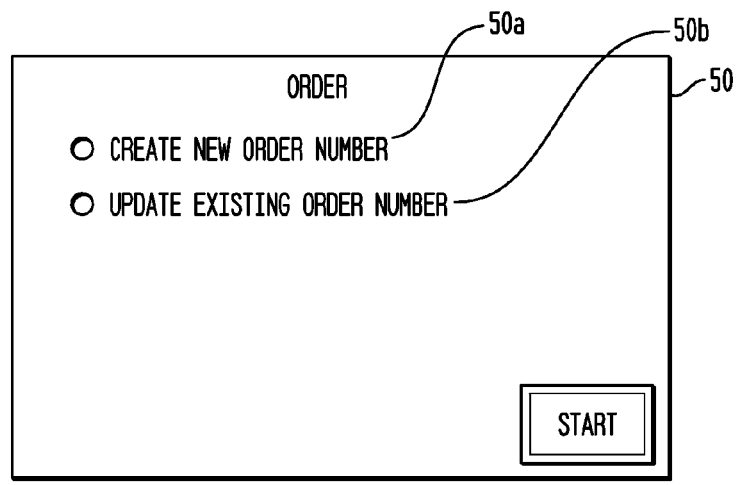
FIG. 3 depicts an order entry window for a user interface for a manufacturing data evaluation application.
Figure 4:
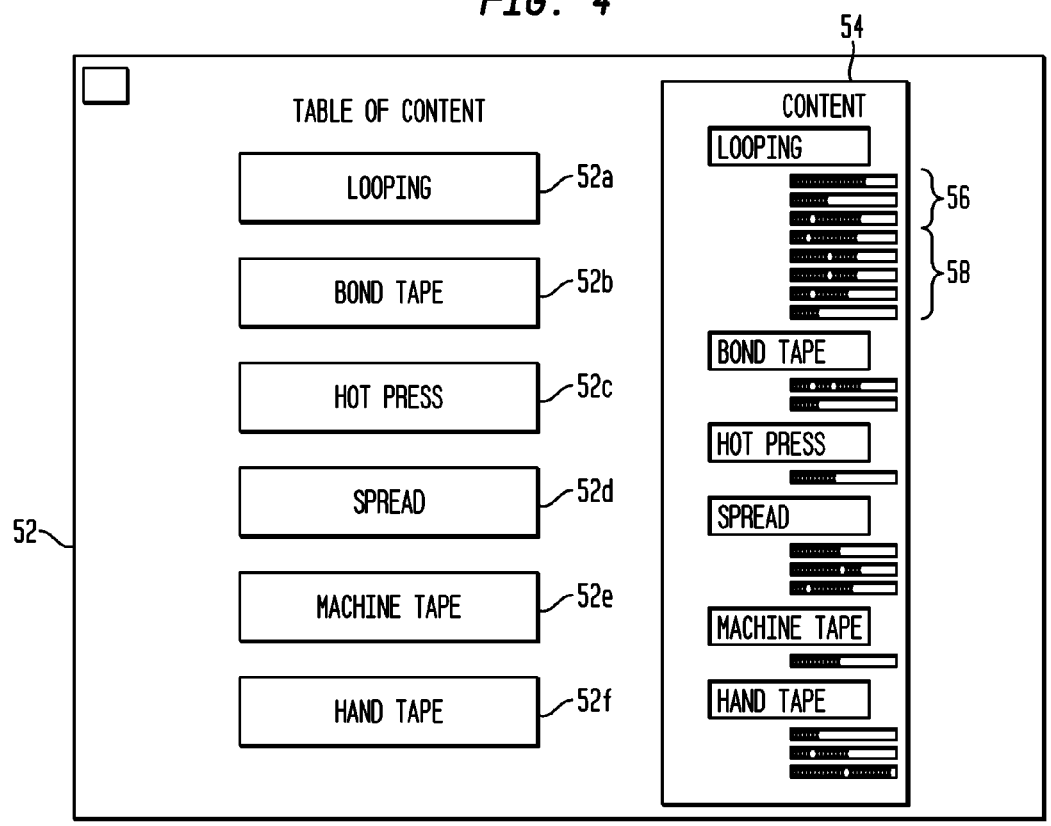
FIG. 4 depicts a table of contents window for a user interface for a manufacturing data evaluation application.
Figure 5:
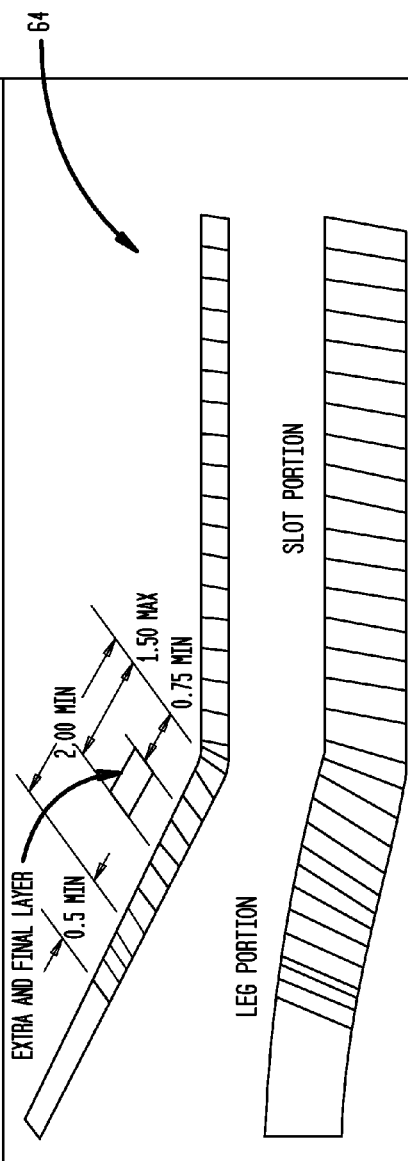
FIG. 5 depicts user interface for the Hand Tape manufacturing stage.

Referring to FIGS. 3 to 5, selected windows of user interface 22 are shown. Referring to FIG. 3, an order entry window 50 in accordance with the present invention is shown. The order entry window 50 enables a user to create a new manufacturing order 50a or to update an existing order 50b. Order entry window 50 corresponds to step 32 of method 30 (see FIG. 2). Alternatively, a previously existing order may be accessed.

Referring to FIG. 4, a table of contents window 52 is shown which displays several exemplary manufacturing stages of a product, such as an induction coil, for example. These include "Looping" 52a, "Bond Tape" 52b, "Hot Press" 52c, "Spread" 52d, "Machine Tape" 52e and "Hand Tape" 52f manufacturing stages for example, although stages may be added or removed as needed. Looping 52a refers to a stage wherein selected copper is re-reeled from spools and wrapped on a rotating arm around pins at either end. Bond Tape 52b refers to a stage wherein a spiral wrap of heat cure tape is applied to a center section of legs of the loops. Hot Press 52c refers to a stage wherein previously wrapped sections are compressed in two directions while being heated to consolidate a "slot section" of a coil. Spread 52d refers to a stage wherein the loops are inserted into a machine which clamps and actuates on 8-axes to bring to a final shape. Machine Tape 52e refers to a stage wherein spread coils are placed in a machine which wraps insulating tape around a portion of the coil (primarily a slot region), Hand Tape 52f refers to a stage wherein hand workers wrap insulating material around the remaining portions of a coil and a coil leads portion. In use, different inspectors or users may select different manufacturing stages from the table contents window 52 to perform inspections as desired.

A right side of process window 52 includes a list or menu 54 of design specifications and other quality control parameters which are associated with each manufacturing stage 52a-52f for an induction coil. The induction coil is checked to ensure that each design specification and quality control parameter is met for an associated manufacturing stage 52a-52f. For example, the induction coil is checked to determine whether design specifications for "Width/Thickness", "Coating", "Loop Diameter", "F Dimensions", "Adhesive Tape I", "Adhesive Tape II" "Lead Length" and "Nomex" are met for Looping stage 52a.

The menu 54 also provides a visual representation of the current manufacturing stage of an induction coil and whether associated design specifications have been met. If Looping stage 52a is selected for example, "Looping" and the associated design specifications in menu 54 may be shaded in a predetermined color such as yellow in menu 54. Once an induction coil has met the "Width/Thickness", "Coating" and "Loop Diameter" specifications 56, for example, these items may be shaded in a different color such as green whereas the remaining specification items "F Dimensions", "Adhesive Tape I", "Adhesive Tape II", "Lead Length" and "Nomex" 58 remain yellow. If an item has not met a design specification, this may be indicated by red shading. The menu 54 also displays the status of inspections for other manufacturing stages which may have been performed by other inspectors. As such, a user is able to quickly determine the overall manufacturing status of the induction coil. Referring to FIG. 5, an exemplary user interface 60 for the Hand Tape manufacturing stage is shown. In particular, FIG. 5 depicts a "Coil Department Checklist" 62 for verifying that selected portions 64 of a coil are wrapped with insulating material.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A computer implemented method for evaluating quality control data of a product manufactured by a partially automated manufacturing process, the method comprising:
   generating a database having design specifications for said product;
   receiving manufacturing data generated from manual inspection of said product at each stage of said partially automated manufacturing process wherein the manufacturing data is received via a user interface;
   comparing said manufacturing data with said design specifications;
   determining whether said manufacturing data meets said design specifications; and
   providing an adaptive product manufacturing procedure to ensure that said manufacturing data meets said design specifications.

2. The method according to claim 1, further comprising notifying quality control if said design specifications are not met.

3. The method according to claim 1, further comprising entering an order to query said database to obtain said design specifications.

4. The method according to claim 1, further comprising providing a color coded indication on a user interface as to whether a design specification has been met.

5. The method according to claim 1, wherein said manufacturing data is stored in a computer server.

6. The method according to claim 1, wherein said design specifications are stored in a computer server.

7. The method according to claim 1, wherein said product is an induction coil.

8. The method according to claim 1, wherein said manufacturing data includes quality control data.

9. A computer implemented method for evaluating quality control data of a product manufactured by a partially automated manufacturing process, the method comprising:
 generating a database having design specifications for said product;
 entering an order to query said database to obtain said design specifications;
 receiving manufacturing data generated from manual inspection of said product at each stage of said partially automated manufacturing process wherein the manufacturing data is received via a user interface;
 comparing said manufacturing data with said design specifications;
 determining whether said manufacturing data meets said design specifications;
 notifying quality control if said design specifications are not met; and
 providing an adaptive product manufacturing procedure to ensure that said manufacturing data meets said design specifications.

10. The method according to claim 9, further comprising providing a color coded indication on a user interface as to whether a design specification has been met.

11. The method according to claim 9, wherein said manufacturing data is stored in a computer server.

12. The method according to claim 9, wherein said design specifications are stored in a computer server.

13. The method according to claim 9, wherein said product is an induction coil.

14. The method according to claim 9, wherein said database is managed by Microsoft SQL Server software.

15. The method according to claim 9, wherein said design specifications include information related to motor size and voltage levels.

16. The method according to claim 9, wherein said manufacturing data is received via a user interface loaded on a workstation coupled to a computer server.

17. The method according claim 9 further comprising generating a time stamp when said manufacturing data is received.

18. The method according to claim 9, wherein said manufacturing data is received from a plurality of inspectors.

19. The method according to claim 9, wherein said manufacturing data includes quality control data.

20. The method according to claim 9, wherein said manufacturing data includes a length and width of said product.

* * * * *